(12) United States Patent
Xu et al.

(10) Patent No.: US 11,427,660 B2
(45) Date of Patent: Aug. 30, 2022

(54) ORGANOSILICON COMPOUNDS AS ELECTRON DONORS FOR OLEFIN POLYMERIZATION CATALYSTS AND METHODS OF MAKING AND USING SAME

(71) Applicant: Formosa Plastics Corporation, USA, Livingston, NJ (US)

(72) Inventors: Demin Xu, Port Lavaca, TX (US); Guangxue Xu, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 41 days.

(21) Appl. No.: 15/491,672

(22) Filed: Apr. 19, 2017

(65) Prior Publication Data

US 2018/0051105 A1 Feb. 22, 2018

Related U.S. Application Data

(63) Continuation of application No. 15/239,220, filed on Aug. 17, 2016, now abandoned.

(51) Int. Cl.
*C08F 110/06* (2006.01)

(52) U.S. Cl.
CPC .................................. *C08F 110/06* (2013.01)

(58) Field of Classification Search
None
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata' et al. |
| 4,226,963 A | 10/1980 | Giannini et al. |
| 4,294,721 A | 10/1981 | Cecchin et al. |
| 4,315,835 A | 2/1982 | Scata et al. |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,472,524 A | 9/1984 | Albizzati |
| 4,473,660 A | 9/1984 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,816,433 A | 3/1989 | Terano et al. |
| 4,978,648 A | 12/1990 | Barbe' et al. |
| 5,106,807 A | 4/1992 | Morini et al. |
| 5,175,332 A | 12/1992 | Chatterton et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,723,400 A | 3/1998 | Morini et al. |
| 5,902,765 A | 5/1999 | Takahashi et al. |
| 5,948,872 A | 9/1999 | Kioka et al. |
| 6,121,483 A | 9/2000 | Fushimi et al. |
| 6,228,961 B1 | 5/2001 | Grison et al. |
| 6,362,124 B1 | 3/2002 | Kuribayashi et al. |
| 6,436,864 B1 | 8/2002 | Tagge |
| 6,552,136 B1 | 4/2003 | Ota et al. |
| 6,605,562 B1 | 8/2003 | Morini et al. |
| 6,683,017 B2 | 1/2004 | Gao et al. |
| 6,689,849 B1 | 2/2004 | Sadashima et al. |
| 6,770,586 B2 | 8/2004 | Tashino et al. |
| 6,818,583 B1 | 11/2004 | Morini et al. |
| 6,822,109 B2 | 11/2004 | Xie et al. |
| 6,825,309 B2 | 11/2004 | Morini et al. |
| 7,009,015 B2 | 3/2006 | Evain et al. |
| 7,022,640 B2 | 4/2006 | Morini et al. |
| 7,049,377 B1 | 5/2006 | Morini et al. |
| 7,202,314 B2 | 4/2007 | Morini et al. |
| 7,208,435 B2 | 4/2007 | Hosaka et al. |
| 7,223,712 B2 | 5/2007 | Morini et al. |
| 7,238,758 B2 | 7/2007 | Yoshikiyo et al. |
| 7,244,794 B2 | 7/2007 | Park et al. |
| 7,324,431 B2 | 1/2008 | Lestable |
| 7,351,778 B2 | 4/2008 | Gao et al. |
| 7,371,802 B2 | 5/2008 | Gulevich et al. |
| 7,388,061 B2 | 6/2008 | Gao et al. |
| 7,393,806 B2 | 7/2008 | Bradley et al. |

(Continued)

FOREIGN PATENT DOCUMENTS

| | | |
|---|---|---|
| EP | 0350170 A2 | 6/1989 |
| EP | 0361493 A1 | 4/1990 |

(Continued)

OTHER PUBLICATIONS

Machine-generated English translation for JP 7-216015.*

*Primary Examiner* — Yun Qian

(74) *Attorney, Agent, or Firm* — Jones Walker LLP

(57) ABSTRACT

Organosilicon compounds having a structure represented by the general formula

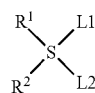

and a method for using same are provided as electron donors in the Ziegler-Natta type catalyst system for the homo-polymerization or co-polymerization of alpha olefins. The organosilicon compounds may be used in the preparation of the solid catalyst component, thus serving as "internal electron donors", or employed during or prior to polymerization as "external electron donors," and therefore they can be used to prepare phthalate-free polyolefins.

18 Claims, 2 Drawing Sheets

(56) References Cited

U.S. PATENT DOCUMENTS

| | | |
|---|---|---|
| 7,420,021 B2 | 9/2008 | Chen |
| 7,491,781 B2 | 2/2009 | Uhrhammer et al. |
| 7,544,748 B2 | 6/2009 | Gulevich et al. |
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,893,033 B2 | 2/2011 | Hung et al. |
| 7,964,678 B2 | 6/2011 | Wang et al. |
| 8,003,558 B2 | 8/2011 | Chang |
| 8,003,559 B2 | 8/2011 | Chang |
| 8,088,872 B2 | 1/2012 | Chen et al. |
| 8,211,819 B2 | 7/2012 | Chang |
| 8,222,357 B2 | 7/2012 | Chen |
| 8,227,370 B2 | 7/2012 | Chang |
| 8,236,908 B2 | 8/2012 | Hirahata et al. |
| 8,247,314 B2 | 8/2012 | Arena |
| 8,247,341 B2 | 8/2012 | Gonzalez et al. |
| 8,247,504 B2 | 8/2012 | Yano et al. |
| 8,263,520 B2 | 9/2012 | Coalter, III et al. |
| 8,263,692 B2 | 9/2012 | Sheard et al. |
| 8,288,304 B2 | 10/2012 | Chen et al. |
| 8,288,585 B2 | 10/2012 | Chen et al. |
| 8,318,626 B2 | 11/2012 | Chang |
| 8,383,540 B2 | 2/2013 | Chen et al. |
| 8,470,941 B2 | 6/2013 | Yi et al. |
| 8,536,290 B2 | 9/2013 | Chen et al. |
| 8,569,195 B2 | 10/2013 | Chang |
| 8,575,283 B1 | 11/2013 | Fang et al. |
| 8,604,146 B2 | 12/2013 | Chen et al. |
| 8,614,162 B2 | 12/2013 | Coalter, III |
| 8,633,126 B2 | 1/2014 | Coalter, III et al. |
| 8,648,001 B2 | 2/2014 | Hosaka et al. |
| 8,664,142 B2 | 3/2014 | Kim et al. |
| 8,692,927 B2 | 4/2014 | Pease et al. |
| 8,716,417 B2 | 5/2014 | Yi et al. |
| 8,740,947 B2 | 6/2014 | Rezach |
| 9,156,927 B2 | 10/2015 | Gao et al. |
| 2009/0286942 A1* | 11/2009 | Van Pelt ............... C08F 210/16 526/124.3 |
| 2013/0244863 A1 | 9/2013 | Xu |
| 2014/0275456 A1 | 9/2014 | Xu et al. |
| 2014/0378298 A1 | 12/2014 | Kipiani et al. |
| 2015/0361194 A1 | 12/2015 | Umezawa-Vizzini et al. |
| 2016/0060372 A1 | 3/2016 | Saeed et al. |

FOREIGN PATENT DOCUMENTS

| | | |
|---|---|---|
| EP | 0437263 A1 | 7/1991 |
| EP | 0460590 A1 | 12/1991 |
| EP | 0576411 A1 | 12/1993 |
| EP | 0601496 A1 | 6/1994 |
| EP | 0641807 A2 | 3/1995 |
| EP | 1538167 A1 | 6/2005 |
| EP | 2159232 A1 | 3/2010 |
| EP | 2345675 A1 | 7/2011 |
| EP | 2610273 A1 | 7/2013 |
| EP | 2799456 A1 | 11/2014 |
| JP | 7-216015 * | 8/1995 |
| WO | 00/26259 A1 | 5/2000 |
| WO | 00/63261 A1 | 10/2000 |
| WO | 03/068723 A1 | 8/2003 |
| WO | 13/092205 A1 | 6/2013 |

* cited by examiner

GC/MS spectrum of diisopropylmethoxy-2-tetrahydrofuryl silane in Example 1

¹H-NMR of diisopropylmethoxy-2-tetrahydrofuryl silane in Example 1

ORGANOSILICON COMPOUNDS AS ELECTRON DONORS FOR OLEFIN POLYMERIZATION CATALYSTS AND METHODS OF MAKING AND USING SAME

CROSS REFERENCE TO RELATED APPLICATION

This application is a continuation of U.S. application Ser. No. 15/239,220, filed on Aug. 17, 2016, which is incorporated by reference herein in its entirety.

BACKGROUND

This invention relates to organosilicon compounds that may be used as electron donors in phthalate-free olefin polymerization catalyst systems, to methods of making such polymerization catalyst systems, and to polymerization processes to produce polyolefins, particularly polypropylene, having good hydrogen response.

The applications of Ziegler-Natta catalyst systems for olefin polymerization are well known in the art. For the polymerization of propylene, Ziegler-Natta catalyst systems have been widely used, which generally comprise a solid catalyst component and a co-catalyst component of an organoaluminum compound. To improve the activity and stereospecificity of the catalyst system, certain electron-donating compounds have been used as internal electron donors in the solid catalyst component and/or as external electron donors to be used in conjunction with the solid catalyst component and the co-catalyst component.

It is well known in the art that polymerization activity, stereoregularity, hydrogen response, molecular weight, and molecular weight distribution of the resulting polymer are associated with the molecular structure of the internal electron donors employed and catalyst preparation methods. Acceptable internal electron donors, which are used in the solid Ziegler-Natta catalyst components during preparation of such catalysts, include organic compounds containing O, Si, N, S, and/or P, such as esters, ethers, ketones, amines, alcohols, phenols, phosphines and silanes. Of this group of compounds, phthalates, diol esters, diethers, and succinates have been most preferred. Examples of such internal electron donors and their use as a component of the solid catalyst system are described in U.S. Pat. Nos. 4,107,414, 4,186,107, 4,226,963, 4,347,160, 4,382,019, 4,435,550, 4,465,782, 4,530,912, 4,532,313, 4,560,671, 4,657,882, 5,208,302, 5,902,765, 5,948,872, 6,121,483, 6,436,864, 6,770,586, 7,022,640, 7,049,377, 7,202,314, 7,208,435, 7,223,712, 7,371,802, 7,491,781, 7,544,748, 7,674,741, 7,674,943, 7,888,437, 7,888,438, 7,964,678, 8,003,558, 8,003,559, 8,088,872, 8,211,819, 8,227,370, 8,236,908, 8,247,341, 8,263,520, 8,263,692, 8,288,304, 8,288,585, 8,318,626, 8,383,540, 8,536,290, 8,569,195, 8,575,283, 8,604,146, 8,633,126, 8,692,927, 8,664,142, 20130244863A1 and 20140275456A1, which are incorporated by reference herein.

Alkyl phthalates as internal electron donors are most commonly used in current commercial propylene polymerization catalysts. However, certain environmental issues have been recently raised concerning the continued use of phthalates in human contact applications. As a result, the employment of a phthalate-free propylene polymerization catalyst is now necessary for the production of phthalate-free polypropylene to remedy these issues. Therefore, in order to develop phthalate-free catalysts, there has been an effort and desire to develop non-phthalate internal electron donors. Examples of such internal electron donors and their use as a component of the catalyst system are described in EP Patent Nos. EP437263, EP0361493, EP1042372, EP1088009, EP1478617, EP2,159,232, EP2,345,675, EP2610273, EP2,794,676, EP2799456, and in U.S. Pat. Nos. 5,106,807, 5,723,400, 6,605,562, 6,683,017, 6,818,583, 6,822,109, 6,825,309, 7,324,431, 7,351,778, 7,388,061, 7,420,021, 8,222,357, 8,247,314, 8,470,941, 8,716,417, 8,740,947, 9,156,927, 20140378298A1, 20150361194, and 20160060372, which are incorporated by reference herein.

In the utilization of Ziegler-Natta catalysts for polymerization involving the isotacticity of propylene or other olefins, it is known in the art that external electron donors act as stereoselective control agents to improve isotacticity of the resulted polymer products by selectively poisoning or converting the non-stereoregularity active sites present on the surface of a solid catalyst. Acceptable external electron donors include organic compounds containing O, Si, N, S, and P. Such compounds include organic acids, organic acid esters, organic acid anhydrides, ethers, ketones, alcohols, aldehydes, silanes, amides, amines, amine oxides, thiols, various phosphorus acid esters, amides etc. Preferred external electron donors are organosilicon compounds containing Si—O—C and/or Si—N—C bonds, having silicon as the central atom. Such compounds are described in EP Patent Nos. EP0350170, EP0460590, EP0576411, EP0601496, EP0641807, EP1538167, and in U.S. Pat. Nos. 4,472,524, 4,473,660, 4,560,671, 4,581,342, 4,657,882, 5,106,807, 5,175,332, 5,407,883, 5,684,173, 6,228,961, 6,362,124, 6,552,136, 6,689,849, 7,009,015, 7,238,758, 7,244,794, 7,393,806, 7,619,049 and 7,790,819, 7,893,033, 8,247,504, 8,648,001 and 8,614,162, which are incorporated by reference herein.

There is a continuing need for developing catalyst systems that can be used to produce polyolefins, particularly polypropylene, with good hydrogen response to obtain a high melt flow product. In addition to good hydrogen response, desired catalyst systems should also offer good polymerization activity and a steady and wide operating window for controlling isotacticity of the resulting polymers based on end user application requirements.

SUMMARY OF THE INVENTION

This invention relates to organosilicon compounds, to their applications as electron donors for polymerization catalyst systems, to polymerization catalyst systems employing these organic compounds as a component, to methods of making such polymerization catalyst systems, and to polymerization processes to produce polyolefins, particularly polypropylene, which yield a phthalate free polypropylene product with high melt flow rate.

The organosilicon compounds of the present invention used as electron donors in polymerization catalyst systems are represented by Formula 1:

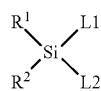

[Formula 1]

wherein L1 and L2 are independent functional groups, which may be identical or different, containing at least one hetero atom selected from O, S, N, and P atoms, and wherein $R^1$ and $R^2$, which may be identical or different, are selected from hydrocarbyl and heterohydrocarbyl groups. Organosilicon compounds of Formula 1 have been included and used as internal electron donors in the solid catalyst component and/or as external electron donors to be used in conjunction with the solid catalyst component and the co-catalyst component.

The process of catalyst component preparation includes halogenating a procatalyst precursor in the presence of the organosilicon compounds of Formula 1 or combined electron donors using organosilicon compound of Formula 1 with other electron donors containing O, S, N, P function groups.

BRIEF DESCRIPTION OF THE DRAWINGS

The features and advantages of the present invention will be appreciated upon reference to the following drawings.

DETAILED DESCRIPTION

Figure 1:
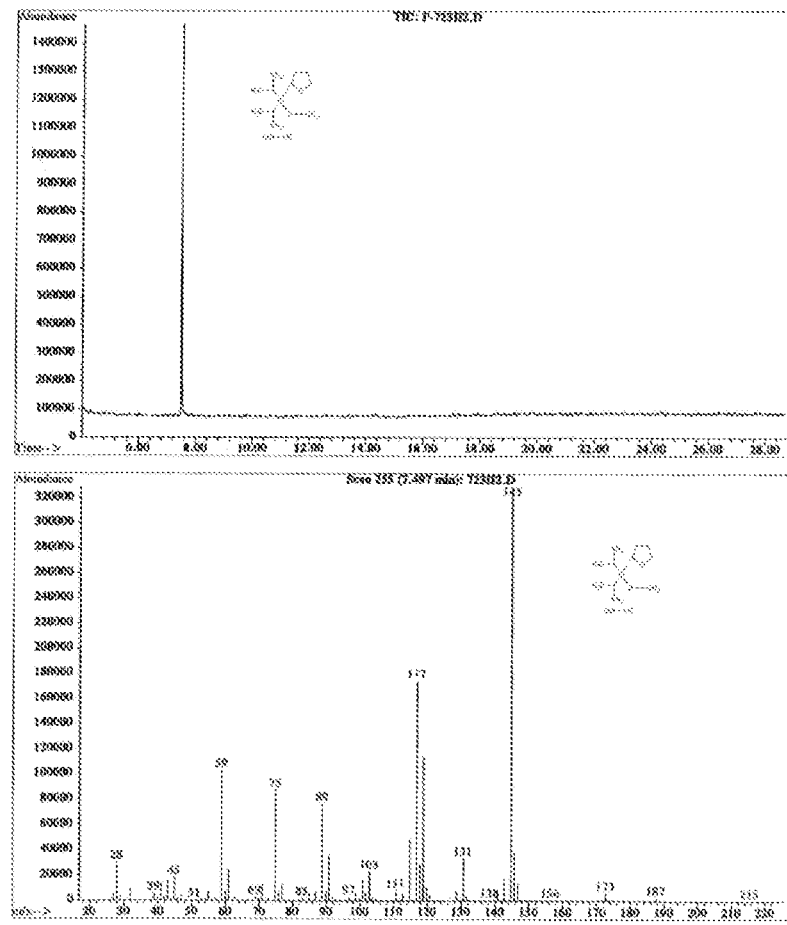
FIG. 1 is a GC/MS spectrum of diisopropylmethoxy-2-tetrahydrofuryl silane in Example 1.

The present invention provides a solid catalyst component for the polymerization of olefins $CH_2=CHR$ in which R is hydrogen or $C_{1-12}$ hydrocarbyl, comprising magnesium, titanium, halogen and electron donors, wherein the electron donors contain a organosilicon compound from Formula 1. The organosilicon compounds of the present invention that may be used as electron donors in polymerization catalyst systems are represented by Formula 1, or combined electron donors using organosilicon compound of Formula 1 with other electron donors containing O, S, N, P function groups.

[Formula 1]

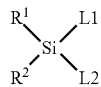

L1 and L2 are independent functional groups, which may be identical or different, and contain at least one hetero atom selected from O, S, N, and P atoms. Specific examples of L1 include the functional groups of Group 1-Group 22:

[Group 1]

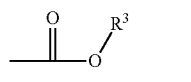

[Group 2]

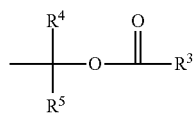

[Group 3]

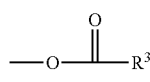

[Group 4]

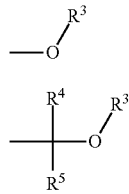

[Group 5]

[Group 6]

[Group 7]

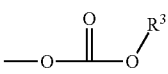

[Group 8]

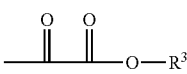

[Group 9]

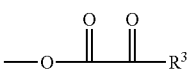

[Group 10]

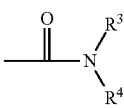

[Group 11]

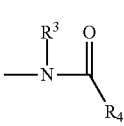

[Group 12]

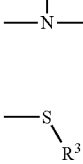

[Group 13]

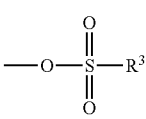

[Group 14]

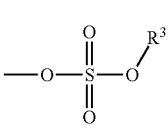

[Group 15]

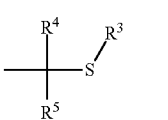

[Group 16]

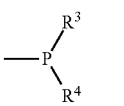

[Group 17]

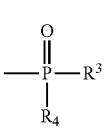

[Group 18]

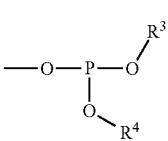

[Group 19]

[Group 20] 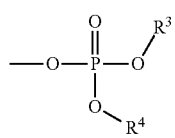
[Group 21] 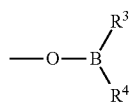
[Group 22] 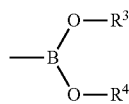
Specific examples of L2 include the functional groups of Group 8-Group 35:
[Group 8] 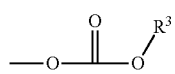
[Group 9] 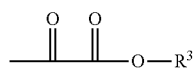
[Group 10] 
[Group 11] 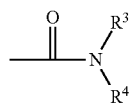
[Group 12] 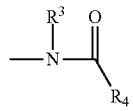
[Group 13] 
[Group 14] 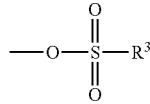
[Group 15] 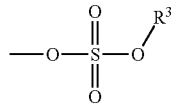
[Group 16] 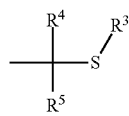
[Group 17] 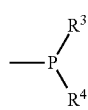
[Group 18] 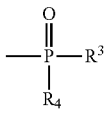
[Group 19] 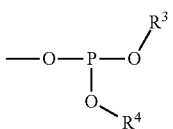
[Group 20] 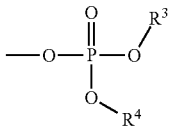
[Group 21] 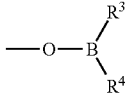
[Group 22] 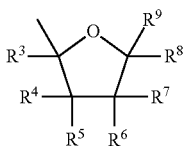
[Group 23] 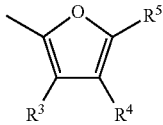
[Group 24] 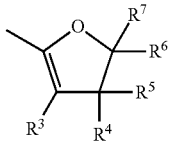
[Group 25] 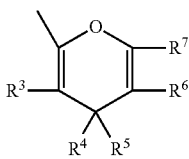
[Group 26] 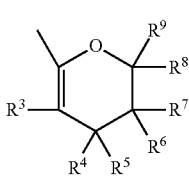
[Group 27]
[Group 28]

[Group 29]

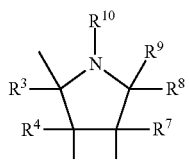

[Group 30]

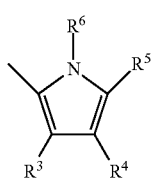

[Group 31]

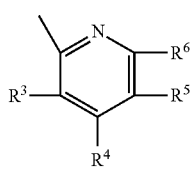

[Group 32]

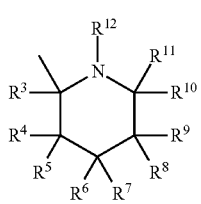

[Group 33]

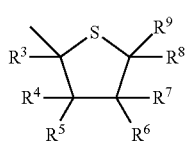

[Group 34]

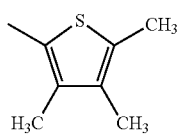

[Group 35]

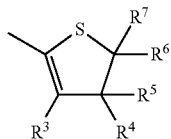

$R^1$ and $R^2$ are independent groups, which may be identical or different, are selected from aliphatic, aromatic, alicyclic, heteroaliphatic, heteroaromatic, or heteroalicyclic groups. The length and structure of $R^1$ and $R^2$ are not otherwise limited.

$R^1$ and $R^2$ groups may, for example, independently contain one or more functional groups of Group 1-Group 35.

[Group 1]

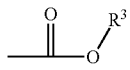

[Group 2]

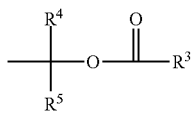

[Group 3]

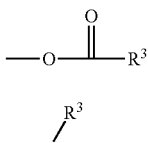

[Group 4]

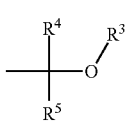

[Group 5]

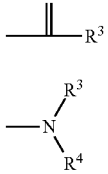

[Group 6]

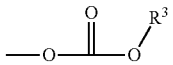

[Group 7]

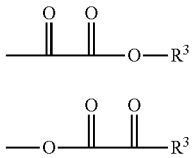

[Group 8]

[Group 9]

[Group 10]

[Group 11]

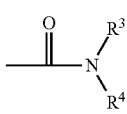

[Group 12]

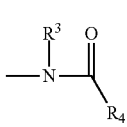

[Group 13]

[Group 14]

[Group 15]

[Group 16]

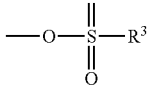

[Group 17]

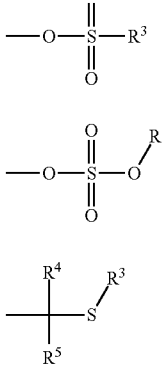

[Group 18] 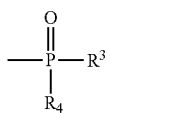

[Group 19] 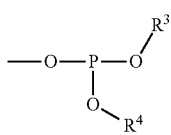

[Group 20] 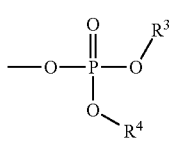

[Group 21] 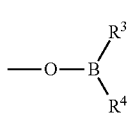

[Group 22] 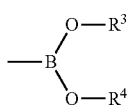

[Group 23] 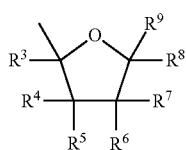

[Group 24] 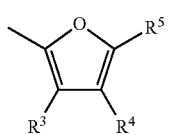

[Group 25] 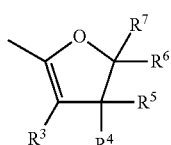

[Group 26] 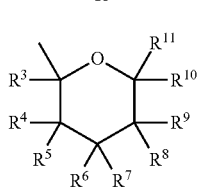

[Group 27] 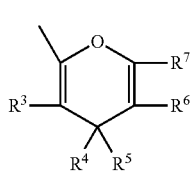

[Group 28] 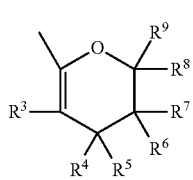

[Group 29] 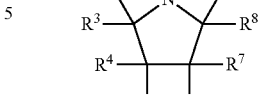

[Group 30] 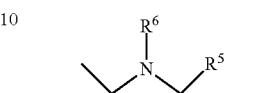

[Group 31] 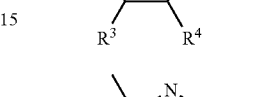

[Group 32] 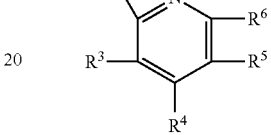

[Group 33] 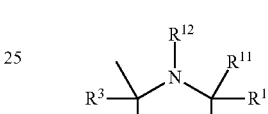

[Group 34] 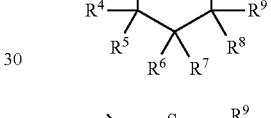

[Group 35] 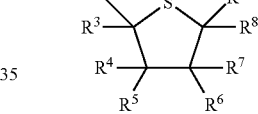

For all of Groups 1-35, $R^3$, $R^4$, $R^5$, $R^6$, $R^7$, $R^8$, $R^9$, $R^{10}$, $R^{11}$ and $R^{12}$, which may be identical or different, are selected from hydrogen, halogen, aliphatic, aromatic, alicyclic, heteroaliphatic, heteroaromatic, or heteroalicyclic groups. The length and structure of $R^3$, $R^4$, $R^5$, $R^6$, $R^7$, $R^8$, $R^9$, $R^{10}$, $R^{11}$ and $R^{12}$ are not otherwise limited. In preferred embodiments of the present invention, $R^3$, $R^4$, $R^5$, $R^6$, $R^7$, $R^8$, $R^9$, $R^{10}$, $R^{11}$ and $R^{12}$ and $R^{11}$ are hydrogen, halogen and alkyl.

The present invention also provides organosilicon compounds, a process of synthesizing them, and applications as electron donors for polymerization catalyst systems, to polymerization catalyst systems employing these organic compounds as electron donors, to methods of making such polymerization catalyst systems, and to polymerization processes to produce polyolefins, particularly polypropylene.

A novel class of organosilicon compounds, as described herein, may be used as electron donors in polymerization catalyst systems for the production of polyolefins, particularly polypropylene. These organosilicon compounds of present invention may be used as either internal electron donors or external electron donors.

Electron donors of the present invention, which utilize the organosilicon compounds of the present invention, include, but not are limited to, furyl organosilicon compounds, pyranyl organosilicon compounds, pyrrolyl organosilicon compounds, thienyl organosilicon compounds and their derivatives.

In one preferred embodiment of the present invention, the organosilicon compounds derived from Formula 1 are tetrahydrofuryl organosilicon compounds of Formula 2:

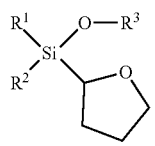

[Formula 2]

wherein $R^1$, $R^2$ and $R^3$ are defined essentially the same as Formula 1, with the proviso that the functional groups L1 and L2 are tetrahydrofuryl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl.

Non-limiting examples of these organosilicon compounds from Formula 2 include: diisopropylmethoxy-2-tetrahydrofurylsilane, dicyclopentylmethoxy-2-tetrahydrofuryl silane, cyclohexylmethylmethoxy-2-tetrahydrofurylsilane, diphenylmethoxy-2-tetrahydrofurylsilane, isobutylisopropylmethoxy-2-tetrahydrofurylsilane, bis(perhydroquinolino) methoxy-2-tetrahydrofurylsilane, diisobutylmethoxy-2-tetrahydrofurylsilane, isobutylcyclopentylmethoxy-2-tetrahydrofurylsilane, isobutylcyclohexylmethoxy-2-tetrahydrofurylsilane, isopropyldimethoxy-2-tetrahydrofurylsilane, isobutyldimethoxy-2-tetrahydrofurylsilane, cyclopentyldimethoxy-2-tetrahydrofurylsilane, cyclohexyldimethoxy-2-tetrahydrofurylsilane, phenyldimethoxy-2-tetrahydrofurylsilane, perhydroquinolinodimethoxy-2-tetrahydrofuryl silane, methoxy-2-tetrahydrofurylsilacyclopentane, and 2-methoxy-2-tetrahydrofurylsilacyclohexane, and their corresponding structures:

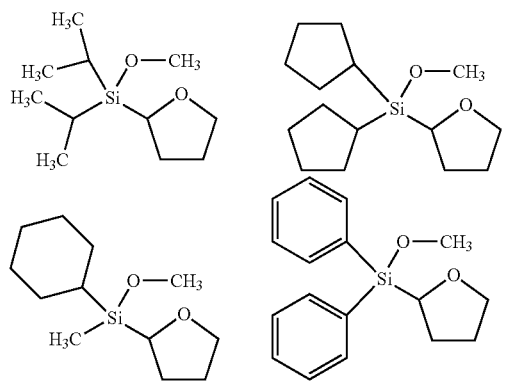

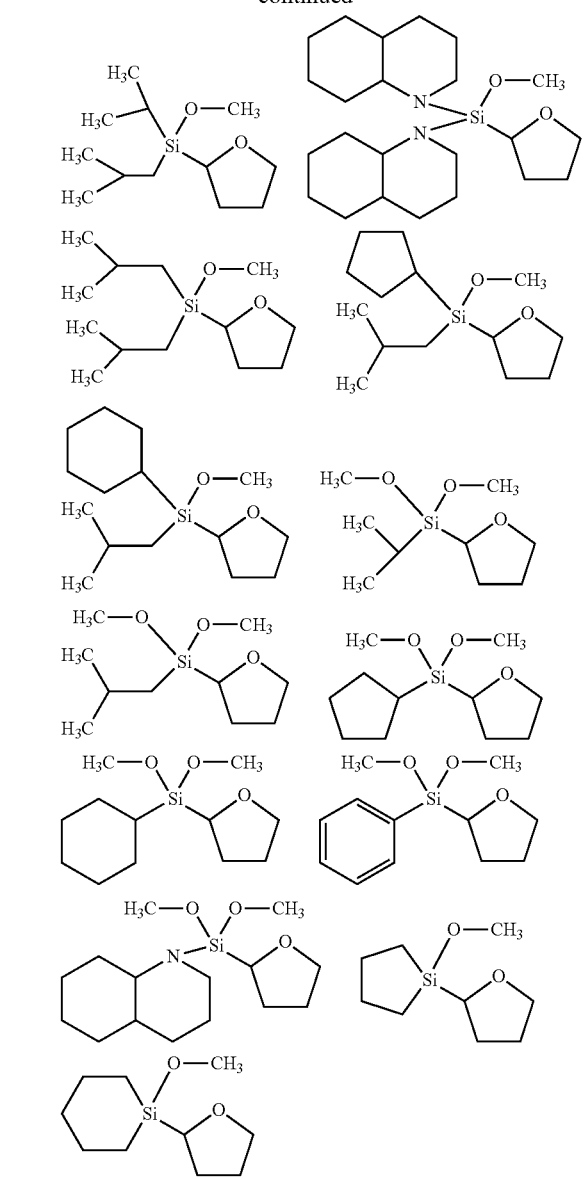

Other examples of organosilicon compounds from Formula 2 include, but not are limited to: diisopropylethoxy-2-tetrahydrofurylsilane, dicyclopentylethoxy-2-tetrahydrofurylsilane, cyclohexylmethylethoxy-2-tetrahydrofurylsilane, diphenylethoxy-2-tetrahydrofurylsilane, isobutylisopropylethoxy-2-tetrahydrofurylsilane, bis(perhydroquinolino) ethoxy-2-tetrahydrofurylsilane, diisobutylethoxy-2-tetrahydrofurylsilane, isobutylcyclopentylethoxy-2-tetrahydrofurylsilane, isobutylcyclohexylethoxy-2-tetrahydrofurylsilane, isopropyldiethoxy-2-tetrahydrofurylsilane, isobutyldiethoxy-2-tetrahydrofurylsilane, cyclopentyldiethoxy-2-tetrahydrofurylsilane, cyclohexyldiethoxy-2-tetrahydrofurylsilane, phenyldiethoxy-2-tetrahydrofurylsilane, perhydroquinolinodiethoxy-2-tetrahydrofurylsilane, ethoxy-2-tetrahydrofurylsilacyclopentane, and ethoxy-2-tetrahydrofurylsilacyclohexane.

In another preferred embodiment of the present invention, the organosilicon compounds derived from Formula 1 are tetrahydrofuryl organosilicon compounds of Formula 3:

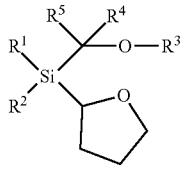

[Formula 3]

wherein $R^1$, $R^2$, $R^3$, $R^4$ and $R^5$ are defined essentially the same as Formula 1, with the proviso that the functional groups L1 and L2 are tetrahydrofurfuryl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of these organosilicon compounds from Formula 3 include: diisopropylmethoxymethyl-2-tetrahydrofurylsilane, dicyclopentylmethoxymethyl-2-tetrahydrofurylsilane, cyclohexylmethylmethoxymethyl-2-tetrahydrofurylsilane, diphenylmethoxymethyl-2-tetrahydrofurylsilane, isobutylisopropylmethoxymethyl-2-tetrahydrofurylsilane, bis(perhydroquinolino)methoxymethyl-2-tetrahydrofurylsilane, diisobutylmethoxymethyl-2-tetrahydrofuryl silane, isobutylcyclopentylmethoxymethyl-2-tetrahydrofurylsilane, isobutylcyclohexylmethoxymethyl-2-tetrahydrofurylsilane, methoxymethyl-2-tetrahydrofurylsilacyclopentane, and methoxymethyl-2-tetrahydrofurylsilacyclohexane, and their corresponding structures:

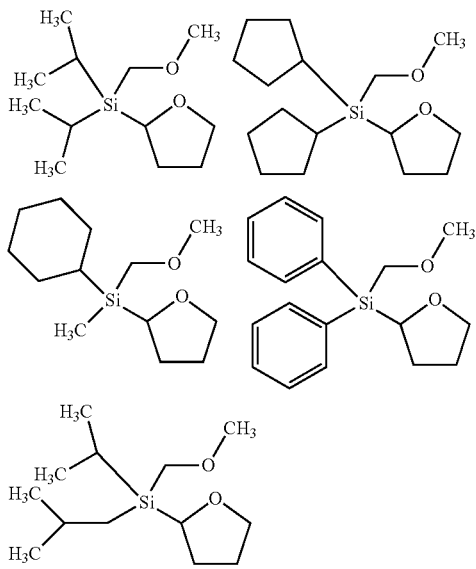

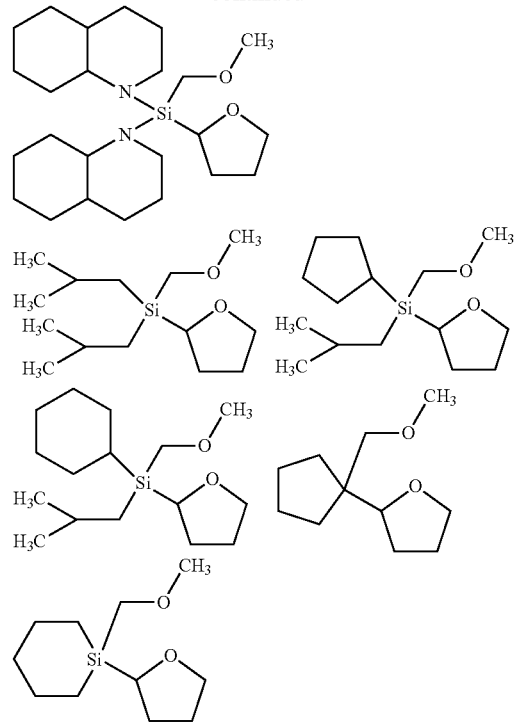

Other examples of organosilicon compounds from Formula 3 include, but not are limited to: isopropylmethoxymethy-di-2-tetrahydrofurylsilane, cyclopentylmethoxymethyl-di-2-tetrahydrofurylsilane, cyclohexylmethoxymethyl-di-2-tetrahydrofurylsilane, phenylmethoxymethyl-di-2-tetrahydrofuryl silane, isobutylmethoxymethyl-di-2-tetrahydrofuryl silane, perhydroquinolinomethoxymethyl-di-2-tetrahydrofurylsilane, dimethoxymethyl-di-2-tetrahydrofuryl silane, and methoxymethyl tri-2-tetrahydrofurylsilane.

In yet another preferred embodiment of the present invention, the organosilicon compounds derived from Formula 1 are furyl organosilicon compounds of Formula 4:

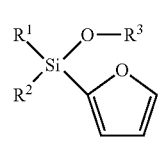

[Formula 4]

wherein $R^1$, $R^2$ and $R^3$ are defined essentially the same as Formula 1, with the proviso that the functional groups L1 and L2 are furyl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl.

Non-limiting examples of organosilicon compounds from Formula 4 include: diisopropylmethoxy-2-furylsilane, dicyclopentylmethoxy-2-furyl silane, cyclohexylmethylmethoxy-2-furylsilane, diphenylmethoxy-2-furylsilane, isobutylisopropylmethoxy-2-furylsilane, bis(perhydroquinolino)methoxy-2-furylsilane, diisobutylmethoxy-2-furylsilane, isobutylcyclopentylmethoxy-2-furylsilane, isobutylcyclohexylmethoxy-2-furylsilane, isopropyldimethoxy-2-furylsilane, isobutyldimethoxy-2-furylsilane, cyclopentyldimethoxy-2-furylsilane, cyclohexyldimethoxy-2-furylsilane, phenyldimethoxy-2-furylsilane, perhydroquinolinodimethoxy-2-furyl silane, methoxy-2-furylsilacyclopentane, and methoxy-2-furylsilacyclohexane.

In yet another preferred embodiment of the present invention, the organosilicon compounds derived from Formula 1 are dihydrofuryl organosilicon compounds of Formula 5:

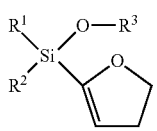

[Formula 5]

wherein $R^1$, $R^2$ and $R^3$ are defined essentially the same as Formula 1, with the proviso that the functional groups L1 and L2 are dihydrofuryl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, preferably or cycloalkyl, methyl or.

Non-limiting examples of organosilicon compounds from Formula 5 include: diisopropylmethoxy-2-(4,5-dihydrofuryl)silane, dicyclopentylmethoxy-2-(4,5-dihydrofuryl) silane, cyclohexylmethylmethoxy-2-(4,5-dihydrofuryl)silane, diphenylmethoxy-2-(4,5-dihydrofuryl)silane, isobutylisopropylmethoxy-2-(4,5-dihydrofuryl) silane, bis(perhydroquinolino)methoxy-2-(4,5-dihydrofuryl)silane, diisobutylmethoxy-2-(4,5-dihydrofuryl)silane, isobutylcyclopentylmethoxy-2-(4,5-dihydrofuryl)silane, isobutylcyclohexylmethoxy-2-(4,5-dihydrofuryl)silane, isopropyldimethoxy-2-(4,5-dihydrofuryl)silane, isobutyldimethoxy-2-(4,5-dihydrofuryl)silane, cyclopentyldimethoxy-2-(4,5-dihydrofuryl)silane, cyclohexyldimethoxy-2-(4,5-dihydrofuryl)silane, phenyldimethoxy-2-(4,5-dihydrofuryl)silane, perhydroquinolinodimethoxy-2-(4,5-dihydrofuryl)silane, methoxy-2-(4,5-dihydrofuryl)silacyclopentane, and methoxy-2-(4,5-dihydrofuryl)silacyclohexane.

In yet another preferred embodiment of the present invention, the organosilicon compounds derived from Formula 1 are furyl organosilicon compounds of Formula 6:

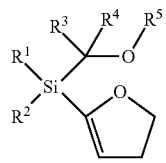

[Formula 6]

wherein $R^1$, $R^2$, $R^3$, $R^4$ and $R^5$ are defined essentially the same as Formula 1, with the proviso that the functional groups L1 and L2 are furyl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of organosilicon compounds from Formula 6 include: diisopropylmethoxymethyl-2-furylsilane, dicyclopentylmethoxymethyl-2-furylsilane, cyclohexylmethylmethoxymethyl-2-furylsilane, diphenylmethoxymethyl-2-furylsilane, isobutylisopropylmethoxymethyl-2-furylsilane, bis(perhydroquinolino) methoxymethyl-2-furylsilane, diisobutylmethoxymethyl-2-furyl silane, isobutylcyclopentylmethoxymethyl-2-furylsilane, isobutylcyclohexylmethoxymethyl-2-furylsilane, methoxymethyl-2-furylsilacyclopentane, and methoxymethyl-2-furylsilacyclohexane.

In yet another preferred embodiment of the present invention, the organosilicon compounds derived from Formula 1 are dihydrofuryl organosilicon compounds of Formula 7:

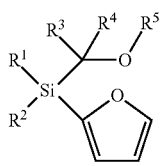

[Formula 7]

wherein $R^1$, $R^2$, $R^3$, $R^4$ and $R^5$ are defined essentially the same as Formula 1, with the proviso that the functional groups L1 and L2 are dihydrofuryl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of organosilicon compounds from Formula 7 include: diisopropylmethoxymethyl-2-(4,5-dihydrofuryl) silane, dicyclopentylmethoxymethyl-2-(4,5-dihydrofuryl) silane, cyclohexylmethylmethoxymethyl-2-(4,5-dihydrofuryl)silane, diphenylmethoxymethyl-2-(4,5-dihydrofuryl)silane, isobutylisopropyl methoxymethyl-2-(4,5-dihydrofuryl) silane, bis(perhydroquinolino) methoxymethyl-2-(4,5-dihydrofuryl) silane, diisobutylmethoxymethyl-2-(4,5-dihydrofuryl) silane, isobutylcyclopentylmethoxymethyl-2-(4,5-dihydrofuryl)silane, isobutylcyclohexylmethoxymethyl-2-(4,5-dihydrofuryl)silane, methoxymethyl-2-(4,5-dihydrofuryl) silacyclopentane, and methoxymethyl-2-(4,5-dihydrofuryl) silacyclohexane.

In yet another embodiment of the present invention, the organosilicon compounds derived from Formula 1 are thienyl organosilicon compounds of Formula 8:

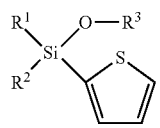

[Formula 8]

wherein $R^1$, $R^2$ and $R^3$ are defined essentially the same as Formula 1, with the proviso that the functional groups L1 and L2 are thienyl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl.

Non-limiting examples of organosilicon compounds from Formula 8 include: diisopropylmethoxy-2-thienylsilane, dicyclopentylmethoxy-2-thienyl silane, cyclohexylmethylmethoxy-2-thienylsilane, diphenylmethoxy-2-thienylsilane, isobutylisopropylmethoxy-2-thienylsilane, bis(perhydroquinolino)methoxy-2-thienylsilane, diisobutylmethoxy-2-thienylsilane, isobutylcyclopentylmethoxy-2-thienylsilane, isobutylcyclohexylmethoxy-2-thienylsilane, isopropyldimethoxy-2-thienylsilane, isobutyldimethoxy-2-thienylsilane, cyclopentyldimethoxy-2-thienylsilane, cyclohexyldimethoxy-2-thienylsilane, phenyldimethoxy-2-thienylsilane, perhydroquinolinodimethoxy-2-thienyl silane, methoxy-2-thienylsilacyclopentane, and methoxy-2-thienylsilacyclohexane.

In yet another preferred embodiment of the present invention, the organosilicon compounds derived from Formula 1 are thienyl organosilicon compounds of Formula 9:

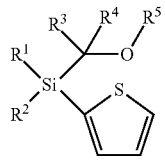

[Formula 9]

wherein $R^1$, $R^2$, $R^3$, $R^4$ and $R^5$ are defined essentially the same as Formula 1, with the proviso that the functional groups L1 and L2 are thienyl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of organosilicon compounds from Formula 9 include: diisopropylmethoxymethyl-2-thienylsilane, dicyclopentylmethoxymethyl-2-thienylsilane, cyclohexylmethylmethoxymethyl-2-thienylsilane, diphenylmethoxymethyl-2-thienylsilane, isobutylisopropylmethoxymethyl-2-thienylsilane, bis(perhydroquinolino) methoxymethyl-2-thienylsilane, diisobutylmethoxymethyl-2-thienyl silane, isobutylcyclopentylmethoxymethyl-2-thienylsilane, isobutylcyclohexylmethoxymethyl-2-thienylsilane, methoxymethyl-2-thienylsilacyclopentane, and methoxymethyl-2-thienylsilacyclohexane.

In yet another preferred embodiment of the present invention, the organosilicon compounds derived from Formula 1 are pyrrolyl organosilicon compounds of Formula 10:

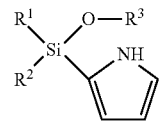

[Formula 10]

wherein $R^1$, $R^2$ and $R^3$ are defined essentially the same as Formula 1, with the proviso that the functional groups L1 and L2 are pyrrolyl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl.

Non-limiting examples of organosilicon compounds from Formula 10 include: diisopropylmethoxy-2-pyrrolyl silane, dicyclopentylmethoxy-2-pyrrolyl silane, cyclohexylmethylmethoxy-2-pyrrolyl silane, diphenylmethoxy-2-pyrrolyl silane, isobutylisopropylmethoxy-2-pyrrolyl silane, bis(perhydroquinolino)methoxy-2-pyrrolyl silane, diisobutylmethoxy-2-pyrrolyl silane, isobutylcyclopentylmethoxy-2-pyrrolyl silane, isobutylcyclohexylmethoxy-2-pyrrolyl silane, isopropyldimethoxy-2-pyrrolyl silane, isobutyldimethoxy-2-pyrrolyl silane, cyclopentyldimethoxy-2-pyrrolyl silane, cyclohexyldimethoxy-2-pyrrolyl silane, phenyldimethoxy-2-pyrrolyl silane, perhydroquinolinodimethoxy-2-pyrrolyl silane, methoxy-2-pyrrolyl silacyclopentane, and methoxy-2-pyrrolyl silacyclohexane.

In yet another preferred embodiment of the present invention, the organosilicon compounds derived from Formula 1 are pyrrolyl organosilicon compounds of Formula 11:

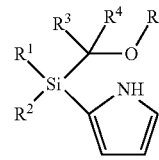

[Formula 11]

wherein $R^1$, $R^2$, $R^3$, $R^4$ and $R^5$ are defined essentially the same as Formula 1, with the proviso that the functional groups L1 and L2 are pyrrolyl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of organosilicon compounds from Formula 11 include: diisopropylmethoxymethyl-2-pyrrolyl silane, dicyclopentylmethoxymethyl-2-pyrrolyl silane, cyclohexylmethylmethoxymethyl-2-pyrrolyl silane, diphenylmethoxymethyl-2-pyrrolyl silane, isobutylisopropylmethoxymethyl-2-pyrrolyl silane, bis(perhydroquinolino) methoxymethyl-2-pyrrolyl silane, diisobutylmethoxymethyl-2-pyrrolyl silane, isobutylcyclopentylmethoxymethyl-2-pyrrolyl silane, isobutylcyclohexylmethoxymethyl-2-pyrrolyl silane, methoxymethyl-2-pyrrolyl silacyclopentane, and methoxymethyl-2-pyrrolyl silacyclohexane.

In yet another preferred embodiment of the present invention, the organosilicon compounds derived from Formula 1 are pyridyl organosilicon compounds of Formula 12:

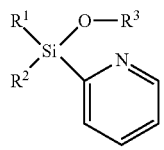

[Formula 12]

wherein $R^1$, $R^2$ and $R^3$ are defined essentially the same as Formula 1, with the proviso that the functional groups L1 and L2 are pyridyl and alkoxyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl.

Non-limiting examples of organosilicon compounds from Formula 12 include: diisopropylmethoxy-2-pyridyl silane, dicyclopentylmethoxy-2-pyridyl silane, cyclohexylmethylmethoxy-2-pyridyl silane, diphenylmethoxy-2-pyridyl silane, isobutylisopropylmethoxy-2-pyridyl silane, bis(perhydroquinolino)methoxy-2-pyridyl silane, diisobutylmethoxy-2-pyridyl silane, isobutylcyclopentylmethoxy-2-pyridyl silane, isobutylcyclohexylmethoxy-2-pyridyl silane, isopropyldimethoxy-2-pyridyl silane, isobutyldimethoxy-2-pyridyl silane, cyclopentyldimethoxy-2-pyridyl silane, cyclohexyldimethoxy-2-pyridyl silane, phenyldimethoxy-2-pyridyl silane, perhydroquinolinodimethoxy-2-pyridyl silane, methoxy-2-pyridyl silacyclopentane, and methoxy-2-pyridyl silacyclohexane.

In yet another preferred embodiment of the present invention, the organosilicon compounds derived from Formula 1 are pyridyl organosilicon compounds of Formula 13:

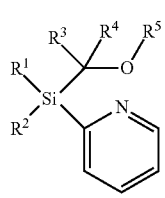

[Formula 13]

wherein $R^1$, $R^2$, $R^3$, $R^4$ and $R^5$ are defined essentially the same as Formula 1, with the proviso that the functional groups L1 and L2 are pyridyl and alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Non-limiting examples of organosilicon compounds from Formula 13 include: diisopropylmethoxymethyl-2-pyridylsilane, dicyclopentylmethoxymethyl-2-pyridylsilane, cyclohexylmethylmethoxymethyl-2-pyridylsilane, diphenylmethoxymethyl-2-pyridylsilane, isobutylisopropylmethoxymethyl-2-pyridylsilane, bis(perhydroquinolino) methoxymethyl-2-pyridylsilane, diisobutylmethoxymethyl-2-pyridyl silane, isobutylcyclopentylmethoxymethyl-2-pyridylsilane, isobutylcyclohexylmethoxymethyl-2-pyridylsilane, methoxymethyl-2-pyridylsilacyclopentane, and methoxymethyl-2-pyridylsilacyclohexane.

In yet another preferred embodiment of the present invention, the organosilicon compounds derived from Formula 1 are tetrahydropyranyl organosilicon compounds of Formula 14 and Formula 15:

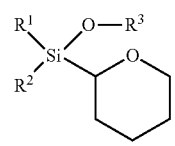

[Formula 14]

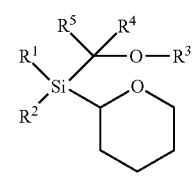

[Formula 15]

wherein $R^1$, $R^2$ and $R^3$, $R^4$ and $R^5$ are defined essentially the same as Formula 1, with the proviso that the functional groups L1 and L2 are tetrahydropyranyl, alkoxyl and/or alkoxyalkyl substituents.

In this preferred embodiment, $R^1$ and $R^2$ are alkyl, substituted alkyl, aryl, arylalkyl, alkylaryl, alkenyl, cycloalkyl, alkoxyl, aminyl or heterocyclyl. The length and structure of $R^1$ and $R^2$ are not otherwise limited. $R^1$ and $R^2$ can also join each other to form monocyclic or polycyclic rings. $R^3$ is alkyl, substituted alkyl, or cycloalkyl, preferably methyl or ethyl. $R^4$ and $R^5$ are hydrogen, alkyl, substituted alkyl, or cycloalkyl, preferably hydrogen or methyl.

Specific examples of the organosilicon compounds from Formula 14 and 15 include, but are not limited to: dimethylmethoxy-2-tetrahydropyranyl silane, dimethylmethoxymethyl-2-tetrahydropyranyl silane, and diphenylmethoxymethyl-2-tetrahydropyranyl silane.

The organosilicon compounds of the present invention may be used individually or jointly (in the combined form) as a component in Ziegler-Natta type catalyst systems. The solid catalyst component can be made by contacting a magnesium compound and a titanium compound with electron donors containing organosilicon compounds of the present invention. Except for the inclusion of the organosilicon compounds of the present invention, the Ziegler-Natta type catalyst systems, and methods for making such catalyst systems, which may be employed in accordance with the various embodiments of the present invention are not generally limited.

The present invention also provides a solid catalyst component and/or catalyst system for the polymerization of olefins $CH_2$=CHR in which R is hydrogen or $C_{1-12}$ hydrocarbyl, comprising the product of the reaction between: (a) a solid catalyst component comprising a Mg, Ti and halogen and electron donors (internal electron donors); (b) organoaluminium compounds; and (c) one or more electron donors (external electron donors).

The magnesium compounds used in the preparation of the solid catalyst component include halogen containing magnesium compounds. Specific examples of the magnesium compounds include, but are not limited to, magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; carboxylic acid salts of magnesium such as magnesium laurate and magnesium stearate; and other magnesium compounds such as magnesium nitrate, magnesium perchlorate and magnesium sulfate. These magnesium compounds may be in the liquid or solid state. Besides those magnesium compounds, complex compounds or combined compounds of these magnesium compounds can be used with other metal salt compounds, or mixtures of these magnesium compounds with other metal salt compounds.

The catalyst component of the present invention is prepared by contacting magnesium complex with a titanium compound of the general Formula 14:

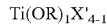  [Formula 14]

wherein X' is a halogen atom; R is a hydrocarbon group having from 1 to 10 carbon atoms, and 1 is an integer from 0 to 4. Specific examples of the titanium compound include, but are not limited to, titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$; dialkoxytitanium dihalides such as $Ti(OCH_3)_2Cl_2$, $Ti(OC_2H_5)_2Cl_2$, $Ti(O-n-C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; tetraalkoxytitaniums such as $Ti(OCH_3)_4$, $Ti(OC_2H_5)_4$, $Ti(O-n-C_4H_9)_4$, $Ti(O-iso-C_4H_9)_4$ and Ti(O-2-ethylhexyl); and other compounds such as $Ti[O—C(CH_3)CH—CO—CH]_2Cl_2$, $Ti[N(C_2H_5)_2]Cl_3$, $Ti[N(C_6H_5)_2]Cl_3$, $Ti(C_6H_5COO)Cl_3$, $[N(C_4H_9)_4]_2TiCl_6$, $[N(CH_3)_4]Ti_2Cl_9$, $TiBr_4$, $TiCl_3OSO_2C_6H_5$, and $LiTi(OC_3H_7)_2Cl_3$. Among these titanium compounds, the halogen containing titanium compounds, especially titanium tetra-halides, have been found to be useful for at least one embodiment. These titanium compounds may be individually or combinedly used as a component in solutions of hydrocarbon compounds or halogenated hydrocarbons.

When preparing the solid catalyst component, an internal electron donor or combined internal electron donors may be added to the preparation and/or may form the solid catalyst component itself and/or other constituents. The solid titanium catalyst component can be made by contacting a magnesium compound and a titanium compound with internal electron donors or combined internal electron donors. Acceptable internal electron donors for the preparing solid Ziegler-Natta type catalyst component include, but are not limited to, organosilicon compounds of the present invention described in Formula 1; esters and their derivatives including aromatic esters, alkyl esters such as benzoic esters, phthalic esters, malonates and succinates; diethers and their derivatives such as 1,3-diethers and 2,4-diethers. Other common internal electron donors, including alkyl or alkylaryl ethers, ketones, mono- or polyamines, aldehydes, and phosphorus compounds, may also be used either individually or combinedly. The compositions obtained according to the aforementioned processes in the preparation of the catalyst component may be further brought into contact one or more times with the titanium compound, and also may be washed with an organic solvent. The methods of preparing solid Ziegler-Natta type catalyst component are disclosed in previous U.S. Pat. Nos. 4,220,554, 4,294,721, 4,315,835, 4,330,649, 4,439,540, 4,816,433, 4,978,648, 7,619,049, 7,790,819, 8,575,283, US 20140275456 and US 20130244863. These methods are incorporated herein by reference.

The catalyst system may contain at least one organoaluminum compound in addition to the solid catalyst component. Compounds having at least one aluminum-carbon bond in the molecule can be used as the organoaluminum compound, consisting of any of alkyl groups, halogen atoms, hydrogen atoms and alkoxyl groups, aluminoxanes, and/or their mixtures. Specific examples of the organoaluminum compounds include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride. These organoaluminium compounds may be used either individually or combinedly. Other acceptable organoaluminium compound includes compounds containing two or more aluminum atoms linked to each other through hetero-atoms, such as: $(C_2H_5)_2Al—O—(C_2H_5)_2$; $(C_2H_5)_2Al—N(C_6H_5)—Al(C_2H)_2$; and $(C_2H_5)_2Al—O—SO_2—OAl(C_2H_5)_2$.

The catalyst system may contain one organosilicon compound or combined donors using organosilicon compound of Formula 1 with other electron donors in addition to the solid catalyst component. This organosilicon compound may, although not always, be referred as external electron donors. In yet another embodiment, the catalyst system may be free of organosilicon compound. The organosilicon compound, when used as external electron donors serving as components of a Ziegler-Natta catalyst system for olefin polymerization, improves the ability of the catalyst system to produce a polymer.

Acceptable external electron donors are organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred electron donors is organosilicon compounds containing Si—O—C and/or Si—N—C bonds, which are represented by the general formulae $SiR_f(OR')_{4-1}$ and $SiR_f(NR_2')_{4-1}$, can also be used as external electron donors, wherein R is hydrogen, an alkyl group, or an aryl group; R' is an alkyl group or aryl group; and m is may be 0-4. Specific examples of organosilicon compound include, but are not limited to: Specific examples of these compounds include, but are not limited to, trimethylmethoxysilane, triethylmethoxysilane, dimethyldimethoxysilane, dimethyldiethoxysilane, diphenyldimethoxysilane, dimethyldiethoxysilane, diphenyldimethoxysilane, diphenyldiethoxysilane, dicyclohexyldimethoxysilane, cyclohexylmethyldimethoxysilane, cyclohexyl-isobutyldimethoxysilane, cyclohexyl-1,1,2-trimethylpropyldimethoxysilane, α-naphthyl-1,1,2-trimethylpropyldimethoxysilane, n-tetradecanyl-1,1,2-trimethylpropyldimethoxysilane, cyclopentylmethyldimethoxysilane, cyclopentylethyldimethoxysilane, cyclopentylpropyldimethoxysilane, cyclopentyl-t-butyldimethoxysilane, cyclopentyl-1,1,2-trimethylpropyldimethoxysilane, dicyclopentyldimethoxysilane, cyclopentylcyclohexyldimethoxysilane, t-butylmethyldimethoxysilane, t-butylethyldimethoxysilane, t-butylpropyldimethoxysilane, di-t-butyldimethoxysilane, diisopropyldimethoxysilane, isopropylisobutyldimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, methyl-t-butoxydimethoxysilane, isopropyl-t-butoxydimethoxysilane, cyclopentyl-t-butoxydimethoxysilane, 1,1,2-trimethylpropyltrimethoxysilane, trimethylphenoxysilane, methyltriallyoxysilane, vinyltris(β-methoxyethoxy)silane, vinyltrisacetoxysilane, dimethyltetraethoxydisiloxane, hexahydro-1,1-dimethoxy-1H,3H-pyrido[1,2-c][1,3,2]oxazasiline, hexahydro-1-ethoxy-1-(2-methylpropyl)-1H,3H-pyrido[1,2-c][1,3,2]oxazasiline, hexahydro-1-ethoxy-1-propyl-1H,3H-pyrido[1,2-c][1,3,2]oxazasiline, hexahydro-1-ethoxy-1-ethyl-1H,3H-pyrido[1,2-c][1,3,2]oxazasiline, hexahydro-1-ethoxy-1-methyl-1H,3H-pyrido[1,2-c][1,3,2]oxazasiline, 3-tert-butyl-2,2-diethoxy-[1,3,2]oxazasilolidine, 3-tert-butyl-2,2-diethoxy-5-methyl-[1,3,2]oxazasilolidine, 3-tert-butyl-2,2-diethoxy-5-ethyl-[1,3,2]oxazasilolidine, 4,9-di-tert-butyl-1,6-dioxa-4,9-diaza-5-sila-spiro[4.4]nonane, 4,9-dibutyl-1,6-dioxa-4,9-diaza-5-sila-spiro[4.4]nonane, 4,9-diethyl-1,6-dioxa-4,9-diaza-5-sila-spiro[4.4]nonane, 4,9-diphenyl-1,6-dioxa-4,9-diaza-5-sila-spiro[4.4]nonane, 4,9-dibenzyl-1,6-dioxa-4,9-diaza-5-sila-spiro[4.4]nonane, 5,11-dimethyl-2,8-diphenyl-1,7-dioxa-5,11-diaza-6-sila-spiro[5.5]undecane, 4,9-di-tert-butyl-2,7-diphenyl-1,6-dioxa-4,9-diaza-5-sila-spiro[4.4]nonane, and 4,9-diisopropyl-2,3,7,8-tetraphenyl-1,6-dioxa-4,9-diaza-5-sila-spiro[4.4]nonane. These organosilicon compounds may be used herein either individually or combinedly.

The organosilicon compounds of the present invention having chemical Formula 1 may be individually or combinedly used as external electron donors in the catalyst system. Specific examples of these organosilicon compounds include, but are not limited to, diisopropylmethoxy-2-tetrahydrofurylsilane, dicyclopentylmethoxy-2-tetrahydrofuryl silane, cyclohexylmethylmethoxy-2-tetrahydrofurylsilane, diphenylmethoxy-2-tetrahydrofurylsilane, isobutylisopropylmethoxy-2-tetrahydrofurylsilane, bis(perhydroquinolino) methoxy-2-tetrahydrofurylsilane, disobutylmethoxy-2-tetrahydrofurylsilane, isobutylcyclopentylmethoxy-2-tetrahydrofurylsilane, isobutylcyclohexylmethoxy-2-tetrahydrofurylsilane, isopropyldimethoxy-2-tetrahydrofurylsilane, isobutyldimethoxy-2-tetrahydrofurylsilane, cyclopentyldimethoxy-2-tetrahydrofurylsilane, cyclohexyldimethoxy-2-tetrahydrofurylsilane, phenyldimethoxy-2-tetrahydrofurylsilane, perhydroquinolinodimethoxy-2-tetrahydrofuryl silane, methoxy-2-tetrahydrofurylsilacyclopentane, 2-methoxy-2-tetrahydrofurylsilacyclohexane, diisopropylmethoxy-2-thienylsilane, dicyclopentylmethoxy-2-thienyl silane, cyclohexylmethylmethoxy-2-thienylsilane, diphenylmethoxy-2-thienylsilane, isobutylisopropylmethoxy-2-thienylsilane, bis(perhydroquinolino)methoxy-2-thienylsilane, disobutylmethoxy-2-thienylsilane, isobutylcyclopentylmethoxy-2-thienylsilane, isobutylcyclohexylmethoxy-2-thienylsilane, isopropyldimethoxy-2-thienylsilane, isobutyldimethoxy-2-thienylsilane, cyclopentyldimethoxy-2-thienylsilane, cyclohexyldimethoxy-2-thienylsilane, phenyldimethoxy-2-thienylsilane, perhydroquinolinodimethoxy-2-thienyl silane, methoxy-2-thienylsilacyclopentane, methoxy-2-thienylsilacyclohexane. diisopropylmethoxymethyl-2-tetrahydrofurylsilane, dicyclopentylmethoxymethyl-2-tetrahydrofurylsilane, cyclohexylmethylmethoxymethyl-2-tetrahydrofurylsilane, diphenylmethoxymethyl-2-tetrahydrofurylsilane, isobutylisopropylmethoxymethyl-2-tetrahydrofurylsilane, bis(perhydroquinolino) methoxymethyl-2-tetrahydrofurylsilane, disobutylmethoxymethyl-2-tetrahydrofuryl silane, isobutylcyclopentylmethoxymethyl-2-tetrahydrofurylsilane, isobutylcyclohexylmethoxymethyl-2-tetrahydrofurylsilane, methoxymethyl-2-tetrahydrofurylsilacyclopentane, and methoxymethyl-2-tetrahydrofurylsilacyclohexane.

The catalyst component of the present invention is not limited by polymerization process, and polymerization of olefins may be performed in the presence of, or in the absence of, an organic solvent. Olefin monomers may be used in the gaseous or liquid state depending on the polymerization as slurry, liquid or gas phase processes, or in a combination of liquid and gas phase processes using separate reactors, all of which can be done either by batch or continuously. The polyolefin may be directly obtained from gas phase process, or obtained by isolation and recovery of solvent from the slurry process, according to conventionally known methods. The olefin monomer can be added prior to, with, or after the addition of the Ziegler-Natta type catalyst system to the polymerization reactor.

The catalyst component of the present invention is combined with the external electron donors and an organoaluminium compound for the polymerization of olefins. The organoaluminium compound is used in a molar ratio of from 1 to 1000 per atom of titanium in the catalyst component, and the external electron donors s are used in a molar ratio of less than 1, preferably from 0.005 to 0.5 per mole of the organoaluminium compound. The molecular weight of the polymers may be controlled by known methods, preferably by using hydrogen. With the catalyst component produced according to the present invention, molecular weight may be suitably controlled with hydrogen when the polymerization is carried out at relatively low temperatures, e.g., from about 30° C. to about 105° C. This control of molecular weight may be evidenced by a measurable positive change of polymerization melt flow rate (MFR).

There are no particular restrictions on the polymerization conditions for production of polyolefins by the methods of the present invention, such as the polymerization temperature, polymerization time, polymerization pressure, or monomer concentration. The polymerization temperature is generally from about 40° C. to about 90° C., and the polymerization pressure is generally one atmosphere or higher. The catalyst component of the present invention may be pre-contacted with small quantities of olefin monomer, well known in the art as pre-polymerization, in a hydrocarbon solvent at a temperature of about 60° C. or lower for a time sufficient to produce a quantity of polymer from about 0.5 to 3 times the weight of the catalyst. If such pre-polymerization is conducted in liquid or gaseous monomer, the quantity of resultant polymer is generally up to 1000 times the catalyst weight.

Examples of olefins homo-polymerized or copolymerized by using the catalyst component of the present invention include olefins of the general formula $CH_2=CHR$, where R is H or $C_{1-12}$ straight or branched alkyl, such as ethylene, propylene, butene-1, pentene-1, 4-methylpentene-1, octene-1, and the like. The catalyst component of present may be employed in the processes in which ethylene is polymerized and processes involving the homo-polymerization or co-polymerization of propylene is preferred. The olefin polymerization processes that may be used in accordance with the present invention are not generally limited.

EXAMPLES

In order to provide a better understanding of the present invention, the following non-limiting examples are given. Although the examples may be directed to specific embodiments, in no way should the following examples be read to limit or define the entire scope of the invention.

GC/MS and $^1$H-NMR were used to characterize and determine the synthesized compounds. The instrument information is adopted here for reference.

The GC/MS measurement (Gas Chromatograph with Mass Spectrometry) was from Agilent 7890B gas-chromatography, Agilent G4567A auto-injector and Agilent 5977A mass spectra detector.

$^1$H-NMR measurement (proton nuclear magnetic resonance) is from Avance 400 MHz spectrometer, unless specified otherwise, in solvent $CDCl_3$ and with TMS as internal standard.

The solid catalyst composition and polymers in the examples were tested according to the methods described herein. The following analytical methods are used to characterize the polymer.

Xylene insoluble components (XI): 4.0 g of the fully dried polymer was added to 200 ml of xylenes (bp: 137~140° C.) and dissolved with stirring while maintaining the mixture at the boiling point over 30 minutes. The mixture was cooled down to ambient temperature (about 22° C.) within 45 minutes. The soluble matters were separated from insoluble matters by filtration. 100 ml of soluble components were accurately measured and then dried with heating. After removing the solvent, the remainders was further dried under vacuum for 1 hours at 140° C. and then cooled to ambient temperature, and finally the dried remainders was weighed to calculate the xylene insoluble components (wt %).

MFR (melt flow rate) is conducted with ASTM D-1238 at 230° C. with a load of 2.16 kg.

Diisopropyldimethoxysilane (P-donor), cyclohexylmethyldimethoxysilane (C-donor), dicyclopentyldimethoxysilane (D-donor), isobutyl(trimethoxy) silane (97%) and dicyclopentyldichlorosilane (95%) were purchased from Gelest, Inc. of Morrisville, Pa., USA.

Magnesium ethoxide (98%), anhydrous toluene (99.8%), $TiCl_4$ (99.9%), anhydrous n-heptane (99%), diisobutyl phthalate (99%), triethyl aluminum(93%), anhydrous dimethyl sulfoxide (99.9%), paraformaldehyde (95%), sodium ethoxide (95%), ethyl alcohol (anhydrous 99.5%), fluorene (98%), sodium chloride (99%), ethyl acetate (99.8%), anhydrous sodium sulfate (99.0%), sodium hydride 60% in mineral oil, iodomethane (99%), anhydrous pyridine (99.8%), benzoyl chloride (99%), 2,4-pentanediol (98%), anhydrous tetrahydrofuran (THF, 99.9%), furan (99%), 2,3-dihydrofuran (99.0%), n-butyllithium solution in hexane (2.5 M), tetramethylethylenediamine (99.0%) and palladium sulfide on carbon (5%) are all purchased from Sigma-Aldrich Co. of Milwaukee, Wis., USA.

Hydrogen (99.999%) is purchased from Airgas. Methanol (99.9%) is purchased from Fox Scientific Inc.

2,4-diisobutyldibenzoate and 9,9-bis(methoxymethyl) fluorene are prepared according to EP1478617 and U.S. Pat. No. 5,723,400, respectively.

Unless otherwise indicated, all reactions were conducted under an inert atmosphere.

Example 1

Synthesis of diisopropylmethoxy-2-tetrahydrofuryl silane (1) Synthesis of diisopropylmethoxy-2-(4,5-dihydrofuranyl) silane A 250 ml two-necked round bottom flask was charged with 7.0 g 2,3-dihydrofuran and 60 ml anhydrous THF under nitrogen atmosphere. The flask temperature was kept below −30° C. in acetone bath cooled with liquid nitrogen. To this cooled mixture with stirring was added dropwise 40 ml n-butyllithium solution 2.5 M in hexane over 1 hour. After completion of the addition, the reaction mixture was allowed to warm up gradually to ambient temperature and stirred overnight. The mixture was ready for the below reaction.

A solution of 70.0 diisopropyldimethoxysilane (P-donor) in 60 ml anhydrous THF was stirred below 20° C. To this solution, the above mixture was added slowly over 1 hour. The reaction mixture was allowed to warm up gradually to ambient temperature and stirred overnight, and then stirred at 45° C. for 3 hours. The precipitate was filtered and the organic solution was washed with water, and then the water solution is extracted with hexane. The combined organic phase was dried over anhydrous sodium sulfate. After removing the solvent and reactants, total crude product diisopropylmethoxy-2-(4,5-dihydrofuranyl) silane 14.5 g was obtained for the next step.

(2) Synthesis of diisopropylmethoxy-2-tetrahydrofuryl silane

Figure 2:
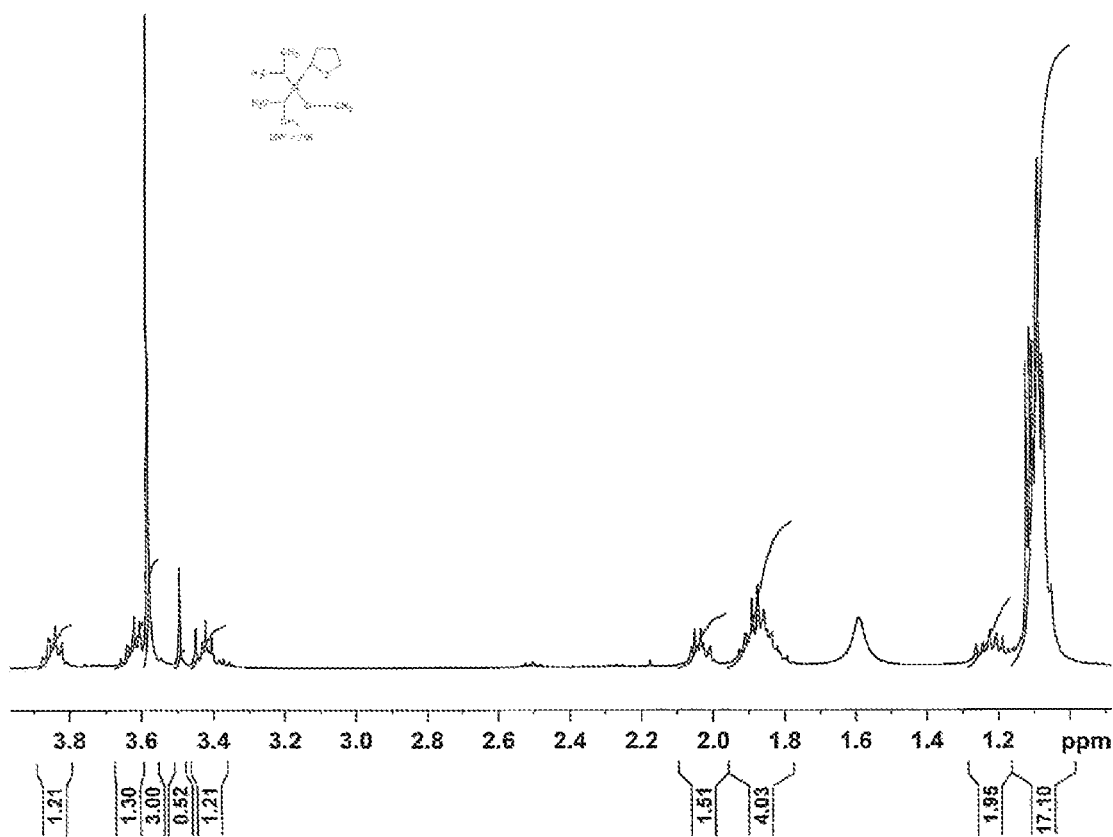
FIG. 2 is $^1$H-NMR of a diisopropylmethoxy-2-tetrahydrofuryl silane in Example 1.

Hydrogenation was conducted using a laboratory scale 600 ml stainless steel autoclave equipped with a stirrer and a jacket for heating and cooling, which was heated to a temperature above 100° C. to expel all traces of air with a nitrogen and hydrogen purge. A solution of 14.5 g diisopropylmethoxy-2-(2,3-dihydrofuranyl) silane synthesized above in the 250 ml methanol was introduced into the autoclave at ambient temperature, and then 1.0 g palladium sulfide on carbon (5%) was added with 100 ml methanol under nitrogen. Hydrogen was introduced to fully purge the autoclave, and then autoclave pressure was built up to 500 psi with stirring 500 RPM at ambient temper and hydrogenation started, which was monitored with GC-MS. When hydrogenation completed, the palladium catalyst was filtered and solvent was removed with rotating evaporator. The crude product was distilled under high vacuum and about 11.2 g of colorless viscous liquid was obtained. The target compound was identified by gas-mass chromatography and $^1$H-NMR, shown in FIG. 1 and FIG. 2. The name and structure of this compound was provided in Table 1.

Example 2

Synthesis of cyclohexylmethylmethoxy-2-tetrahydrofuryl silane

Synthesis procedure was the same as described in Example 1, except that cyclohexylmethyldimethoxysilane 95.0 g (C-donor) was used to replace diisopropyldimethoxysilane. After removing the solvent and distillation, total crude product cyclohexylmethylmethoxy-2-(4,5-dihydrofuranyl) silane 15.2 g was obtained for hydrogenation.

Hydrogenation was processed same as Example 1. After hydrogenation and distillation, 11.5 g of colorless viscous oil was obtained. The target compound was identified by gas-mass chromatography and confirmed by $^1$H-NMR. The name and structure of this compound was provided in Table 1.

Example 3

Synthesis of dicyclopeantylmethoxy-2-tetrahydrofuryl silane

Synthesis procedure was the same as described in Example 1, except that 2,3-dihydrofuran 8.2 g dissolved in 100 ml anhydrous THF and dicyclopeantyldimethoxy silane 100.0 g dissolved in 100 ml anhydrous THF were used respectively. After removing the solvent, total crude product isobutyldimethoxy-2-(4,5-dihydrofuranyl) silane 19.3 g was obtained for hydrogenation.

Hydrogenation was processed same as Example 1. After hydrogenation and distillation, 17.1 g of colorless viscous oil was obtained. The target compound was identified by gas-mass chromatography and confirmed by $^1$H-NMR. The name and structure of this compound was provided in Table 1.

Example 4

Synthesis of isobutyldimethoxy-2-tetrahydrofuryl silane

Synthesis procedure was the same as described in Example 1, except that 2,3-dihydrofuran 14.0 g dissolved in 100 ml anhydrous THF and isobutytriimethoxy silane 37.0 g dissolved in 100 ml anhydrous THF were used respectively. After removing the solvent, total crude product isobutyldimethoxy-2-(4,5-dihydrofuranyl) silane 9.3 g was obtained for hydrogenation.

Hydrogenation was processed same as Example 1. After hydrogenation and distillation, 7.1 g of colorless viscous oil was obtained. The target compound was identified by gas-mass chromatography and confirmed by $^1$H-NMR. The name and structure of this compound was provided in Table 1.

TABLE 1

| Examples | Name | Structure |
| --- | --- | --- |
| Ex. 1 | Diisopropylmethoxy-2-tetrahydrofuryl silane | |
| Ex. 2 | Cyclohexylmethylmethoxy-2-tetrahydrofuryl silane | |
| Ex. 3 | Dicyclopentylmethoxy-2-tetrahydrofuryl silane | |
| Ex. 4 | Isobutyldimethoxy-2-tetrahydrofuryl silane | |

The following examples demonstrate the applications of synthesized compounds in Ziegler-Natta catalysts for olefin polymerization.

Example 5

(A) Preparation of a Solid Catalyst Component:

To a three-neck 250 ml flask equipped with a stirrer and thermometer, which was thoroughly purged with anhydrous nitrogen, 10.0 g of magnesium ethoxide and 80 ml of anhydrous toluene was introduced to form a suspension. 25 ml of TiCl4 was added through a stainless steel cannula. The temperature of the mixture was gradually raised to 80° C., and 2.5 g cyclohexylmethylmethoxy-2-tetrahydrofuranyl silane from Example 2 was added. The temperature of the mixture was then increased to 110° C. and maintained for 2 hours with stirring. The hot mixture was transferred into a Schlenk type reactor equipped with a powered stirrer and a fritted filter disc, which was heated and maintained at the temperature 110° C. The resulting solid was filtered and washed twice with 60 ml of anhydrous toluene at 90° C., and then 80 ml of fresh anhydrous toluene and 25 ml TiCl$_4$ was added to the filtered solid. Then the mixture was heated to 110° C. and stirred for 2 hours. The residual solid was filtered and washed with anhydrous toluene three times at 90° C., and with anhydrous heptane twice at 90° C. and one time at ambient temperature. The final catalyst was collected and dried under vacuum to obtain a solid composition.

(B) Propylene Slurry Polymerization

Propylene was polymerized using a laboratory scale 2 liter stainless steel autoclave equipped with a stirrer and a jacket for heating and cooling, which was heated to a temperature above 100° C. to expel all traces of moisture and air with a nitrogen purge. After allowing the reactor to cool to 50° C. under nitrogen, one liter of anhydrous heptane was introduced into the autoclave, successively followed by adding 2.5 mmol of triethyl aluminum, and then 0.2 mmol of the synthesized compounds cyclohexylmethylmethoxy-2-tetrahydrofuranyl silane from Example 2, and then about 30.0 mg of the solid catalyst obtained above. The autoclave was kept at 50° C. and the pressure of autoclave was controlled about 5.0 psig with nitrogen. Hydrogen in a 150 ml vessel with a pressure of 8 psig was flushed into the reactor with propylene.

The reactor was then raised to 70° C. and the total reactor pressure was raised to 90 psig by feeding propylene. The reaction was maintained for 1 hour under this condition with a continuous propylene feed to maintain a constant pressure during the course of the polymerization. The system was then cooled to 50° C. and vented to reduce the pressure to 0 psig. The reactor was opened and 500 ml methanol was added to the reactor and the resulting mixture was stirred for 5 minutes and then filtered to obtain the polymer product. The obtained polymer was dried under vacuum at 80° C. for 6 hours. The polymer was weighed and tested with melt flow rate (MFR) and xylene insoluble (XI %). The results were listed in Table 2.

Example 6-7

The same catalyst from Example 5 was used for propylene polymerization in Example 6-7. The polymerization procedure was the same as described in Example 5 except that 0.2 mmol of P-donor and C-donor were added respectively during polymerization. The polymers were weighed and tested with melt flow rate (MFR) and xylene insoluble (XI %). The results were listed in Table 2.

TABLE 2

| Examples | External donors | AC (gPP/gCat) | MFR (g/10 min) | XI (%) |
|---|---|---|---|---|
| Ex. 5 | Cyclohexylmethylmethoxy-2-tetrahydrofuranyl silane | 1473 | 10.0 | 96.1 |
| Ex. 6 | Diisopropyldimethoxysilane (P-donor) | 2403 | 5.2 | 96.9 |
| Ex. 7 | Cyclohexylmethyldimethoxysilane (C-donor) | 2240 | 9.0 | 95.2 |

Example 8-10

The catalyst was prepared by following the procedure of Example 5 except that 2.9 g of dicyclopentylmethoxy-2-tetrahydrofuryl silane from Example 3 was used instead of 2.5 g cyclohexylmethylmethoxy-2-tetrahydrofuranyl silane. The final catalyst was collected and dried under vacuum to obtain a solid composition.

The polymerization procedure of Example 8-10 was the same as described in Example 5 except that 0.2 mmol of the synthesized compounds from Example 3, P-donor and C-donor were added as ex-donor respectively during polymerization. The polymers were weighed and tested with melt flow rate (MFR) and xylene insoluble (XI %). The results were listed in Table 3.

TABLE 3

| Examples | External donors | AC (gPP/gCat) | MFR (g/10 min) | XI (%) |
|---|---|---|---|---|
| Ex. 8 | Dicyclopentylmethoxy-2-tetrahydrofuryl silane | 2790 | 8.4 | 95.4 |
| Ex. 9 | Diisopropyldimethoxysilane (P-donor) | 3897 | 3.8 | 96.3 |
| Ex. 10 | Cyclohexylmethyldimethoxysilane (C-donor) | 3517 | 7.3 | 96.2 |

Example 11-14

The catalyst was prepared by following the procedure of Example 5 except that 2.8 g 9,9-bis(methoxymethyl) fluorene was used instead of 2.5 g cyclohexylmethylmethoxy-2-tetrahydrofuranyl silane. The final catalyst was collected and dried under vacuum to obtain a solid composition.

The polymerization procedure of Example 11-14 was the same as described in Example 5. 0.2 mmol of the synthesized compounds from Example 1 to Example 4 were added as ex-donor respectively during polymerization. The polymers were weighed and tested with melt flow rate (MFR) and xylene insoluble (XI %). The results were listed in Table 4 below.

Comparative Example 1-3

The same catalyst from Example 11 was used for propylene polymerization in Comparative Example 1-3. The polymerization procedure was the same as described in Example 5 except that 0.2 mmol of P-donor, C-donor and D-donor were added as external electron donors respectively during polymerization. The polymers were weighed and tested with melt flow rate (MFR) and xylene insoluble (XI %). The results were listed in Table 4.

TABLE 4

| Examples | External donors | AC (gPP/gCat) | MFR (g/10 min) | XI (%) |
|---|---|---|---|---|
| Ex. 11 | Diisopropylmethoxy-2-tetrahydrofuranyl silane | 5013 | 4.5 | 97.9 |
| Ex. 12 | Cyclohexylmethylmethoxy-2-tetrahydrofuranyl silane | 4793 | 5.5 | 98.1 |
| Ex. 13 | Dicyclopentylmethoxy-2-tetrahydrofuranyl silane | 4983 | 5.1 | 98.0 |
| Ex. 14 | Isobutyldimethoxy-2-tetrahydrofuranyl silane | 4077 | 5.8 | 98.3 |
| Comp. Ex. 1 | Diisopropyldimethoxysilane (P-donor) | 5507 | 3.7 | 98.0 |
| Comp. Ex. 2 | Cyclohexylmethyldimethoxysilane (C-donor) | 4717 | 3.1 | 98.0 |
| Comp. Ex. 3 | Dicyclopentyldimethoxysilane (D-donor) | 5550 | 3.3 | 98.1 |

Example 15

Propylene bulk polymerization: The same catalyst from Example 11 was used for propylene bulk polymerization in Example 15. One gallon stainless steel autoclave was used for propylene bulk polymerization. The autoclave was purged with nitrogen and then vacuumed to remove residual moisture at 100° C. for 30 minutes. After the reactor was thereafter cooled down to 20° C. and nitrogen in reactor was released, 15 ml triethyl aluminum hexane solution (0.63 M) and 0.25 mmol of synthesized compounds diisopropylmethoxy-2-tetrahydrofuryl silane from Example 1 were fed into the autoclave under nitrogen, and then 100 mg hydrogen was introduced and 1.7 L liquid propylene was fed into autoclave. After the autoclave was heated to 70° C. with stirring, 15 mg catalyst in 1.5 ml mineral oil was flushed into the reactor with 0.3 L liquid propylene. The polymerization start at 70° C. and was run at this temperature for 60 minutes. The pressure was then relieved and the temperature of the reactor was lowered to ambient temperature. The obtained polymer was dried under vacuum at 80° C. for 6 hours. The polymers were weighed and tested with melt flow rate (MFR) and xylene insoluble (XI %). The results were listed in Table 5 below.

Example 16-18

The same catalyst from Example 11 was used for propylene bulk polymerization in Example 16-18. The polymerization procedure was the same as described in Example 15 except that 0.25 mmol of the synthesized compounds from Example 2 to Example 4 were added respectively during polymerization. The polymers were weighed and tested with melt flow rate (MFR) and xylene insoluble (XI %). The results are listed in Table 5 below.

Comparative Example 4-5

The same catalyst from Example 11 was used for propylene bulk polymerization in Comparative Example 4-5. The polymerization procedure was the same as described in Example 15 except that 0.25 mmol of P-donor and C-donor were added respectively during polymerization. The polymers were weighed and tested with flow rate (MFR) and xylene insoluble (XI %). The results were listed in Table 5.

TABLE 5

| Examples | External donors | AC (gPP/gCat) | MFR (g/10 min) | XI (%) |
|---|---|---|---|---|
| Ex. 15 | Diisopropylmethoxy-2-tetrahydrofuryl silane | 38913 | 9.2 | 96.5 |
| Ex. 16 | Cyclohexylmethylmethoxy-2-tetrahydrofuryl silane | 35227 | 6.5 | 96.2 |
| Ex. 17 | Dicyclopentylmethoxy-2-tetrahydrofuryl silane | 24653 | 6.5 | 96.9 |
| Ex. 18 | Isobutyldimethoxy-2-tetrahydrofuryl silane | 18267 | 5.8 | 97.3 |
| Comp. Ex. 4 | Diisopropyldimethoxysilane (P-donor) | 32560 | 8.7 | 97.2 |
| Comp. Ex. 5 | Cyclohexylmethyldimethoxysilane (C-donor) | 38993 | 8.2 | 97.1 |

Example 19-22

The catalyst was prepared by following the procedure of Example 5 except that 7.0 g of magnesium ethoxide and 2.5 g of 2,4-pentanedioldibenzoate were used instead of 10.0 g magnesium ethoxide and 2.5 g cyclohexylmethylmethoxy-2-tetrahydrofuranyl silane. The final catalyst was collected and dried under vacuum to obtain a solid composition.

The polymerization procedure of Example 19-22 was the same as described in Example 5 except that 0.2 mmol of the synthesized compounds from Example 1 to Example 4 were added as ex-donor respectively during polymerization. The polymers were weighed and tested with melt flow rate (MFR) and xylene insoluble (XI %). The results were listed in Table 6 below.

Comparative Example 6-8

The same catalyst from Example 19 was used for propylene polymerization in Comparative Example 6-8. The polymerization procedure was the same as described in Example 5 except that 0.2 mmol of P-donor, C-donor and D-donor were added as ex-donor respectively during polymerization. The polymers were weighed and tested with melt flow rate (MFR) and xylene insoluble (XI %). The results were listed in Table 6.

TABLE 6

| Examples | External donors | AC (gPP/gCat) | MFR (g/10 min) | XI (%) |
|---|---|---|---|---|
| Ex. 19 | Diisopropylmethoxy-2-tetrahydrofuryl silane | 2243 | 8.4 | 96.7 |
| Ex. 20 | Cyclohexylmethylmethoxy-2-tetrahydrofuryl silane | 2117 | 7.8 | 96.8 |
| Ex. 21 | Dicyclopentylmethoxy-2-tetrahydrofuryl silane | 2137 | 7.1 | 97.0 |
| Ex. 22 | Isobutyldimethoxy-2-tetrahydrofuryl silane | 1643 | 6.3 | 97.4 |
| Comp. Ex. 6 | Diisopropyldimethoxysilane (P-donor) | 3230 | 4.2 | 96.7 |
| Comp. Ex. 7 | Cyclohexylmethyldimethoxysilane (C-donor) | 3247 | 6.5 | 96.3 |
| Comp. Ex. 8 | Dicyclopentyldimethoxysilane (D-donor) | 3483 | 3.9 | 97.0 |

Example 23-26

The catalyst was prepared by following the procedure of Example 5 except that 3.0 g of diisobutyl phthahate was used instead of 2.5 g cyclohexylmethylmethoxy-2-tetrahydrofuranyl silane. The final catalyst was collected and dried under vacuum to obtain a solid composition.

The polymerization procedure of Example 23-26 was the same as described in Example 5. 0.2 mmol of the synthesized compounds from Example 1 to Example 4 were added as ex-donor respectively during polymerization. The polymers were weighed and tested with melt flow rate (MFR) and xylene insoluble (XI %). The results were listed in Table 7 below.

Comparative Example 9-11

The same catalyst from Example 23 was used for propylene polymerization in Comparative Example 9-11. The polymerization procedure was the same as described in Example 5 except that 0.2 mmol of P-donor, C-donor and D-donor were added as ex-donor respectively during polymerization. The polymers were weighed and tested with flow rate (MFR) and xylene insoluble (XI %). The results were listed in Table 7.

TABLE 7

| Examples | External donors | AC (gPP/gCat) | MFR (g/10 min) | XI (%) |
|---|---|---|---|---|
| Ex. 23 | Diisopropylmethoxy-2-tetrahydrofuryl silane | 2680 | 7.8 | 97.1 |
| Ex. 24 | Cyclohexylmethylmethoxy-2-tetrahydrofuryl silane | 2487 | 6.7 | 96.8 |
| Ex. 25 | Dicyclopentylmethoxy-2-tetrahydrofuryl silane | 2627 | 7.6 | 97.0 |
| Ex. 26 | Isobutyldimethoxy-2-tetrahydrofuryl silane | 2257 | 12.3 | 97.1 |
| Comp. Ex. 9 | Diisopropyldimethoxysilane (P-donor) | 4653 | 2.0 | 98.0 |
| Comp. Ex. 10 | Cyclohexylmethyldimethoxysilane (C-donor) | 4640 | 4.4 | 97.5 |
| Comp. Ex. 11 | Dicyclopentyldimethoxysilane (D-donor) | 5187 | 1.6 | 97.9 |

This invention provides a catalyst system which is capable of producing polypropylene with acceptable isotacticity and high MFR. As shown in the above tables, the propylene polymers produced using the catalyst components of the present invention exhibit an MFR value of greater than 4.0, or greater than 7.0, or greater than 10.0, or greater than 12.0 with acceptable isotacticity. On the other hand, the comparative example 9 with diisobutyl phthalate as internal electron donors produced propylene polymer with an MFR value of 2.0. As such, the present inventive catalyst system offers more flexibility to the applications regarding high melting flow ratio and wide molecular distribution range. It also provides a broader approach to produce phthalate-free polyolefins, thus eliminating the environmental issues and health concerns related to the phthalate-containing products.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular embodiments disclosed above may be altered or modified and all such variations are considered within the scope and sprit of the present invention. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A catalyst for the polymerization or co-polymerization of alpha-olefin comprising: a phthalate-free solid catalyst component for the polymerization or co-polymerization of alpha-olefins comprising titanium, magnesium, halogen, and an internal electron donor selected from the group consisting of organosilicon compounds of Formula 1:

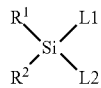

[Formula 1]

wherein L1 is selected from alkoxyl or alkoxyalkyl functional groups;

wherein L2 is selected from furyl, thienyl, pyrrolyl, and pyridyl functional groups; and wherein $R^1$ and $R^2$ are independently selected from aliphatic, aromatic, alicyclic, heteroaromatic, or heteroalicyclic groups.

2. The catalyst of claim 1, further comprising an external electron donor comprising an organosilicon compound of Formula 1.

3. The catalyst of claim 1, wherein one or more H and C atoms in $R^1$ and $R^2$ are replaced by an atom selected from the group consisting of O, N, S, P, B, Si, and halogen atoms.

4. The catalyst of claim 1, wherein two or more of $R^1$, $R^2$, L1, and L2 join to form monocyclic or polycyclic rings.

5. The catalyst of claim 1, wherein the organosilicon compound of Formula 1 is an organosilicon compound of Formula 2:

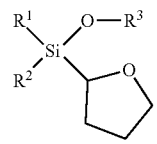

[Formula 2]

wherein $R^3$ is selected from hydrogen, halogen, aliphatic, aromatic, alicyclic, heteroaromatic, or heteroalicyclic groups.

6. The catalyst of claim 1, wherein the organosilicon compound of Formula 1 is an organosilicon compound of Formula 3:

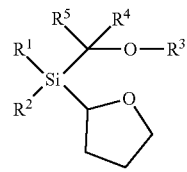

[Formula 3]

wherein $R^3$, $R^4$, and $R^5$ are independently selected from hydrogen, halogen, aliphatic, aromatic, alicyclic, heteroaliphatic, heteroaromatic, or heteroalicyclic groups.

7. The catalyst of claim 1, wherein the organosilicon compound of Formula 1 is an organosilicon compound of Formula 4:

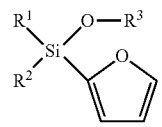

[Formula 4]

wherein $R^3$ is selected from aliphatic, aromatic, alicyclic, heteroaliphatic, heteroaromatic, or heteroalicyclic groups.

8. The catalyst of claim 1, wherein the organosilicon compound of Formula 1 is an organosilicon compound of Formula 5:

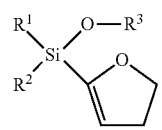

[Formula 5]

wherein $R^3$ is selected from aliphatic, aromatic, alicyclic, heteroaliphatic, heteroaromatic, or heteroalicyclic groups.

9. The catalyst of claim 1, wherein the organosilicon compound of Formula 1 is an organosilicon compound of Formula 6:

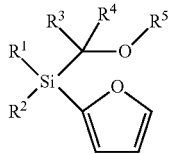

[Formula 6]

wherein $R^3$, $R^4$, and $R^5$ are independently selected from hydrogen, halogen, aliphatic, aromatic, alicyclic, heteroaliphatic, heteroaromatic, or heteroalicyclic groups.

10. The catalyst of claim 1, wherein the organosilicon compound of Formula 1 is an organosilicon compound of Formula 7:

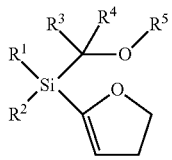

[Formula 7]

wherein $R^3$, $R^4$, and $R^5$ are independently selected from hydrogen, halogen, aliphatic, aromatic, alicyclic, heteroaliphatic, heteroaromatic, or heteroalicyclic groups.

11. The catalyst of claim 1, wherein the organosilicon compound of Formula 1 is an organosilicon compound of Formula 8:

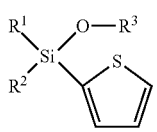

[Formula 8]

wherein $R^3$ is selected from aliphatic, aromatic, alicyclic, heteroaliphatic, heteroaromatic, or heteroalicyclic groups.

12. The catalyst of claim 1, wherein the organosilicon compound of Formula 1 is an organosilicon compound of Formula 9:

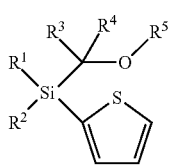

[Formula 9]

wherein $R^3$, $R^4$, and $R^5$ are independently selected from hydrogen, halogen, aliphatic, aromatic, alicyclic, heteroaliphatic, heteroaromatic, or heteroalicyclic groups.

13. The catalyst of claim 1, wherein the organosilicon compound of Formula 1 is an organosilicon compound of Formula 10:

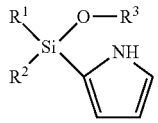

[Formula 10]

wherein $R^3$ is selected from aliphatic, aromatic, alicyclic, heteroaliphatic, heteroaromatic, or heteroalicyclic groups.

14. The catalyst of claim 1, wherein the organosilicon compound of Formula 1 is an organosilicon compound of Formula 11:

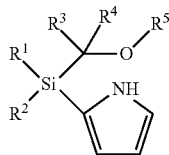

[Formula 11]

wherein $R^3$, $R^4$, and $R^5$ are independently selected from hydrogen, halogen, aliphatic, aromatic, alicyclic, heteroaliphatic, heteroaromatic, or heteroalicyclic groups.

15. The catalyst of claim 1, wherein the organosilicon compound of Formula 1 is an organosilicon compound of Formula 12:

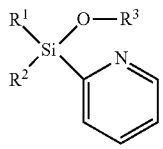

[Formula 12]

wherein $R^3$ is selected from aliphatic, aromatic, alicyclic, heteroaliphatic, heteroaromatic, or heteroalicyclic groups.

16. The catalyst of claim 1, wherein the organosilicon compound of Formula 1 is an organosilicon compound of Formula 13:

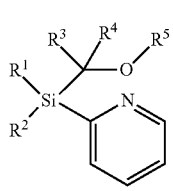

[Formula 13]

wherein $R^3$, $R^4$, and $R^5$ are independently selected from hydrogen, halogen, aliphatic, aromatic, alicyclic, heteroaliphatic, heteroaromatic, or heteroalicyclic groups.

17. The catalyst of claim 1, wherein the organosilicon compound of Formula 1 is an organosilicon compound of Formula 14:

[Formula 14]

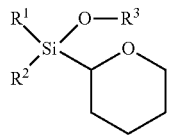

wherein $R^3$ is selected from aliphatic, aromatic, alicyclic, heteroaliphatic, heteroaromatic, or heteroalicyclic groups.

18. The catalyst of claim 1, wherein the organosilicon compound of Formula 1 is an organosilicon compound of Formula 15:

[Formula 15]

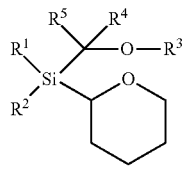

wherein $R^3$, $R^4$, and $R^5$ are independently selected from hydrogen, halogen, aliphatic, aromatic, alicyclic, heteroaliphatic, heteroaromatic, or heteroalicyclic groups.

* * * * *